Inventor
Joseph H. Miguel
By Paul G. Rose, Attorney

Patented June 21, 1938

2,121,708

UNITED STATES PATENT OFFICE 2,121,708

RADIATOR CONSTRUCTION

Joseph H. Miguel, St. Albans, N. Y., assignor to Louis E. Karcher, Middle Village, Long Island, N. Y., and himself, as copartners, trading under the name and style of Miguel Non-Clog Core Company Application July 1, 1937, Serial No. 151,525

3 Claims. (Cl. 257—125)

The present invention relates to the construction of automobile or similar radiators.

The primary object of the invention is to provide a clog-proof radiator.

Experience has proven that clogged radiator tubes or water channels become stopped up due to the deposit of foreign matter from two main sources. First rust and scale from the water circulating passages of the engine become deposited in the tubes and gradually build up to the point where circulation is stopped entirely or is so poor as to seriously impair the cooling of the engine. The second serious source of trouble is scale which forms on the upper part of the top header or tank of the radiator, this deposit being caused by the successive heating and cooling and steaming of the water over a period of time. As this scale builds up, in time, continued expansion and contraction and vibration loosen this scale and particles fall into the tubes and lodge therein forming a dam against which smaller particles of rust and scale build up and retard circulation.

It has been proposed in the past to provide various types of screening arrangements in the water circulating system of internal combustion engines but these have proven unsuccessful because they merely provide a surface against which the larger particles may build up and eventually the screening elements as heretofore proposed get so badly clogged themselves that they retard circulation to a serious extent. Therefore, since it is impossible to get to these members to clean them they have not come into use to any extent.

The present invention contemplates the provision of a screen filter element for automobile radiators which will be effective in preventing solid matter from reaching the water tubes and at the same time will be virtually self-cleaning so that it will not itself become clogged up.

With these problems in mind, an object of this invention is to provide a screening or filter means which in effect form extensions of the water tubes or channels of the radiator extending vertically an appreciable distance above the lower wall of the upper tank or header.

Other objects and advantages of the invention will become apparent during the course of the following detailed description taken in conjunction with the accompanying drawing wherein.

Figure 1:
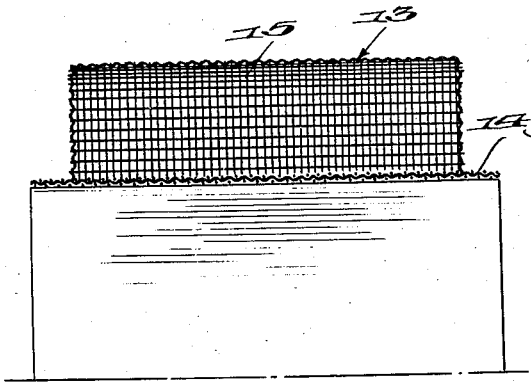
Fig. 1 is a side elevation of a preferred embodiment of the invention.
Figure 2:
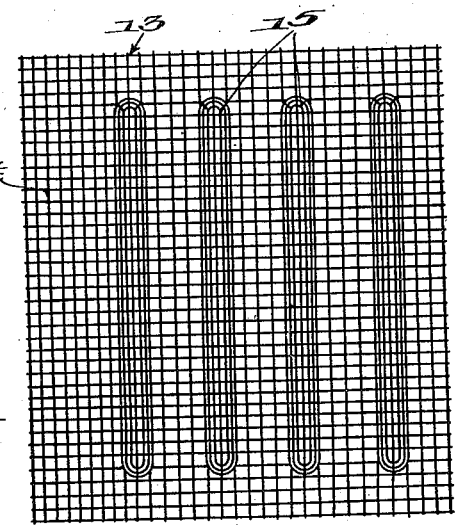
Fig. 2 is a plan view thereof.

Referring now more particularly to the drawing, 10 indicates the usual upper water tank of an automobile radiator having a plurality of water tubes or channels 11 leading from said upper tank or header to a lower tank, not shown. As will be readily understood, the upper tank is connected in the water circulating system of an internal combustion engine and receives water from the circulating jackets thereof, the water flowing down through the tubes 11 to the lower tank and the cooled water in the lower tank returning to the engine.

Mounted on the bottom wall 12 of the upper tank and housed therein is a reticulated filter element 13. The filter element is preferably made of fine mesh wire screen and takes the form of a substantially rectangular base portion 14 having substantially the same outline as the tank bottom 12.

The filter member is provided with a plurality of upstanding ribs 15 extending from front to rear thereof. These ribs 15 are formed of the same material as the base portion and are preferably integral therewith, the unit usually being made up of a single piece of wire mesh by a suitable pressing or other forming operation.

Figure 3:
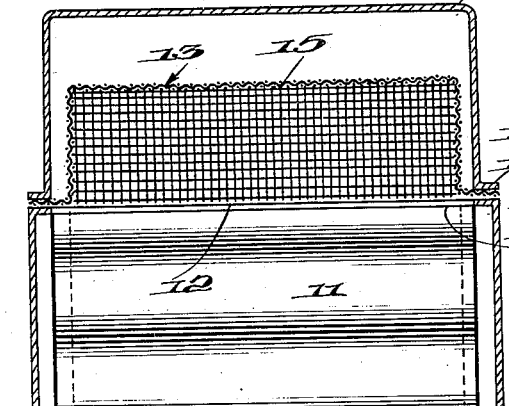
Fig. 3 is a sectional view through one of the vertically extending members.
Figure 4:
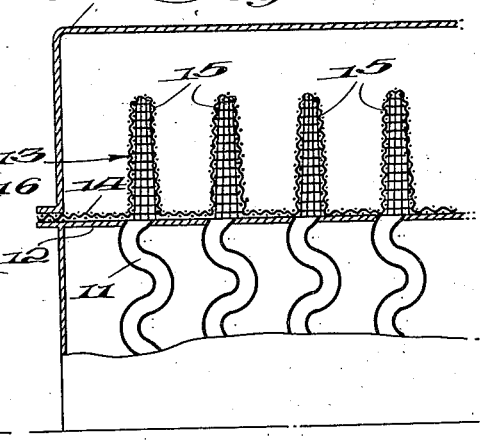
Fig. 4 is a lateral sectional view with parts of the radiator shown diagrammatically.

The ribs 15 are hollow as seen in Figs. 3 and 4, are closed at the top and open at the bottom and are provided with substantially vertical side walls which are spaced apart a distance at least as great as the width of the water channels 11.

As will be seen from an inspection of Fig. 4 there are as many ribs 15 provided as there are water channels, or banks of tubes as the case may be, in the radiator. The ribs are placed directly over the water channels so as to constitute, in effect, a continuation of the channel into the upper tank an appreciable distance above the bottom wall 12 thereof. The ribs may thus be defined as reticulated extensions of the water channels.

The filter unit may be secured in position in any suitable manner as by soldering around the edges to the bottom wall of the upper tank or as shown in Figs. 3 and 4 the edges of the base portion may be soldered between the flange 16 on the header and the edge of the wall 12 when the upper header is assembled.

Figure 5:
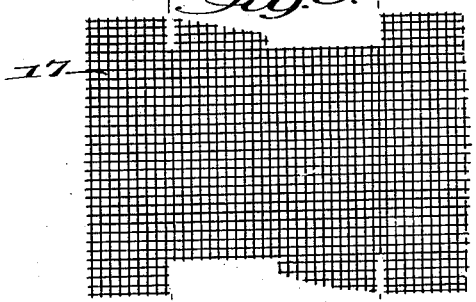
Fig. 5 is a view of a blank for making a modified form of the invention.
Figure 6:
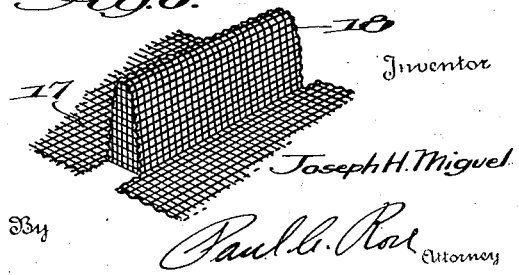
Fig. 6 is a perspective view of the modified form set up.

Fig. 5 illustrates a blank 17 from which the screen unit 18 of Fig. 6 can be made up by a folding operation instead of by pressing as in the case of the form shown in Figs. 1 to 4.

The operation of both forms is the same, that is, foreign matter entrained in the water entering header 10 will be caught by the screen unit and prevented from entering the tubes 11. This foreign matter will be continually washed off of the vertical sides of the ribs 15 and will collect on the base portion between and around the ribs. In this connection it will be noted that the ribs are made with sufficient height that the deposit of years of use on the bottom of the tank would not rise high enough to affect the flow through the protruding sides of the ribs to any noticeable extent.

While a preferred embodiment of the invention has been shown and described for purposes of illustration, it will be understood that various modifications may be made in the details of and manner of constructing the invention, and that such are contemplated and may be resorted to without departing from the spirit of the invention within the scope of the appended claims.

I claim:—

1. In a radiator construction, the combination with an upper tank and a plurality of water channel members leading therefrom, a reticulated filter element mounted in said upper tank formed to provide a plurality of hollow rib-like members, one of said rib-like members overlying the intake end of each of said channel members.

2. In a radiator construction, the combination with an upper tank and a plurality of water channel members leading therefrom, a reticulated filter element mounted in said upper tank, said element comprising a base portion and a plurality of hollow rib-like elements formed with said base portion, said rib-like elements overlying the intake ends of said water channels.

3. In a radiator comprising an upper tank and a plurality of vertical water channel members leading from said tank, the combination with said channels of a plurality of hollow elongated rib-like filter elements mounted in said upper tank, said rib-like filter elements, having substantially vertical side walls and each of said filter elements being positioned in said tank with the hollow portion thereof overlying the upper end of one of said water channels.

JOSEPH H. MIGUEL.